(12) United States Patent
Ezaki et al.

(10) Patent No.: US 11,539,470 B2
(45) Date of Patent: Dec. 27, 2022

(54) RE-TRANSMISSION CONTROL METHOD, RADIO TERMINAL, AND RADIO BASE STATION

(71) Applicant: FUJITSU LIMITED, Kawasaki (JP)

(72) Inventors: Takato Ezaki, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 16/775,787

(22) Filed: Jan. 29, 2020

(65) Prior Publication Data

US 2020/0169358 A1 May 28, 2020

Related U.S. Application Data

(63) Continuation of application No. PCT/JP2017/031049, filed on Aug. 30, 2017.

(51) Int. Cl.
*H04L 1/18* (2006.01)
*H04L 1/00* (2006.01)
(Continued)

(52) U.S. Cl.
CPC .......... *H04L 1/1816* (2013.01); *H04L 1/0003* (2013.01); *H04W 8/24* (2013.01); *H04W 72/042* (2013.01)

(58) Field of Classification Search
CPC .................................................. H04L 1/1816
See application file for complete search history.

(56) References Cited

U.S. PATENT DOCUMENTS 8,532,164 B2 * 9/2013 Hoshino ............... H04L 1/1887
375/220
9,615,329 B2 * 4/2017 Tabet .................... H04L 1/1864
(Continued)

FOREIGN PATENT DOCUMENTS

JP 2010-57175 A 3/2010
JP 2010-219818 A 9/2010
(Continued)

OTHER PUBLICATIONS

3GPP TS 36.211 V14.2.0, "3rd Generation Partnership Project; Technical Specification Group Radio Access Network; Evolved Universal Terrestrial Radio Access (E-UTRA); Physical channels and modulation," (Release 14), Mar. 2017.
(Continued)

*Primary Examiner* — Ivan O Latorre
*Assistant Examiner* — Won Tae C Kim
(74) *Attorney, Agent, or Firm* — Myers Wolin, LLC

(57) ABSTRACT

A re-transmission control method of downlink data to be transmitted from a radio base station to a radio terminal includes: by the radio terminal, transmitting information regarding decoding performance of the radio terminal to the radio base station; receiving the downlink data from the radio base station; transmitting a re-transmission request of the downlink data to the radio base station in a case where an error in the downlink data is detected; receiving a re-transmission configuration based on the information regarding decoding performance of the radio terminal, from the radio base station in a physical downlink control channel (PDCCH), after transmission of the re-transmission request; receiving the downlink data re-transmitted from the radio base station; and decoding the re-transmitted downlink data in accordance with the re-transmission configuration.

12 Claims, 18 Drawing Sheets

(51) Int. Cl.
    *H04W 8/24* (2009.01)
    *H04W 72/04* (2009.01)

(56) References Cited

U.S. PATENT DOCUMENTS

| | | | |
|---|---|---|---|
| 2011/0007834 A1 | 1/2011 | Hoshino et al. | |
| 2011/0319113 A1 | 12/2011 | Takeda et al. | |
| 2012/0005550 A1 | 1/2012 | Ito | |
| 2014/0078941 A1 | 3/2014 | Seo et al. | |
| 2017/0026976 A1* | 1/2017 | Yoo ................. | H04W 72/042 |
| 2017/0207884 A1* | 7/2017 | Jiang ................ | H04L 1/1835 |
| 2017/0264398 A1 | 9/2017 | Uchino et al. | |
| 2019/0053201 A1* | 2/2019 | Nammi ............ | H04L 1/0072 |
| 2019/0053221 A1 | 2/2019 | Takahashi et al. | |
| 2019/0260501 A1* | 8/2019 | Kim ................. | H04L 1/0026 |
| 2021/0105098 A1* | 4/2021 | Matsuda .......... | H04L 1/1896 |

FOREIGN PATENT DOCUMENTS

| | | |
|---|---|---|
| JP | 2013-85281 A | 5/2013 |
| JP | 2014-513462 A | 5/2014 |
| JP | 2016-539597 A | 12/2016 |
| JP | 2017-147515 A | 8/2017 |
| WO | 2010/113214 A1 | 10/2010 |
| WO | 2015/048361 A1 | 4/2015 |
| WO | 2016/121809 A1 | 8/2016 |

OTHER PUBLICATIONS

3GPP TS 36.212 V14.2.0, "3rd Generation Partnership Project; Technical Specification Group Radio Access Network; Evolved Universal Terrestrial Radio Access (E-UTRA); Multiplexing and channel coding," (Release 14), Mar. 2017.

3GPP TS 36.213 V14.2.0, "3rd Generation Partnership Project; Technical Specification Group Radio Access Network; Evolved Universal Terrestrial Radio Access (E-UTRA); Physical layer procedures," (Release 14), Mar. 2017.

3GPP TS 36.300 V14.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," (Release 14), Mar. 2017.

3GPP TS 36.321 V14.2.0, "3rd Generation Partnership Project; Technical Specification Group Radio Access Network; Evolved Universal Terrestrial Radio Access (E-UTRA); Medium Access Control (MAC) protocol specification," (Release 14), Mar. 2017.

3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification," (Release 14), Mar. 2017.

3GPP TS 36.323 V14.2.0, "3rd Generation Partnership Project; Technical Specification Group Radio Access Network; Evolved Universal Terrestrial Radio Access (E-UTRA); Packet Data Convergence Protocol (PDCP) specification," (Release 14), Mar. 2017.

3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification," (Release 14), Mar. 2017.

3GPP TS 36.413 V14.2.0, "3rd Generation Partnership Project; Technical Specification Group Radio Access Network; Evolved Universal Terrestrial Radio Access Network (E-UTRAN); S1 Application Protocol (S1AP)," (Release 14), Mar. 2017.

3GPP TS 36.423 V14.2.0, "3rd Generation Partnership Project; Technical Specification Group Radio Access Network; Evolved Universal Terrestrial Radio Access Network (E-UTRAN); X2 application protocol (X2AP)," (Release 14), Mar. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol," (Release 14), Mar. 2017.

3GPP TR 38.801 V14.0.0, "3rd Generation Partnership Project; Technical Specification Group Radio Access Network; Study on new radio access technology: Radio access architecture and interfaces," (Release 14), Mar. 2017.

3GPP TR 38.802 V14.0.0, "3rd Generation Partnership Project; Technical Specification Group Radio Access Network; Study on New Radio Access Technology: Physical Layer Aspects," (Release 14), Mar. 2017.

3GPP TR 38.803 V14.0.0, "3rd Generation Partnership Project; Technical Specification Group Radio Access Network; Study on New Radio Access Technology: RF and co-existence aspects," (Release 14), Mar. 2017.

3GPP TR 38.804 V14.0.0, "3rd Generation Partnership Project; Technical Specification Group Radio Access Network; Study on New Radio Access Technology: Radio Interface Protocol Aspects," (Release 14), Mar. 2017.

3GPP TR 38.900 V14.2.0, "3rd Generation Partnership Project; Technical Specification Group Radio Access Network; Study on channel model for frequency spectrum above 6 GHz," (Release 14), Dec. 2016.

3GPP TR 38.912 V14.0.0, "3rd Generation Partnership Project; Technical Specification Group Radio Access Network; Study on New Radio (NR) access technology," (Release 14), Mar. 2017.

3GPP TR 38.913 V14.0.0, "3rd Generation Partnership Project; Technical Specification Group Radio Access Network; Study on Scenarios and Requirements for Next Generation Access Technologies;" (Release 14), Mar. 2017.

Saito et al., "Non-Orthogonal Multiple Access (NOMA) for Future Radio Access", Proc. IEEE VTC2013—Spring, pp. 1-5, Jun. 2013.

Huawei et al., "Support of URLLC in DL", Agenda Item: 5.1.3.4, 3GPP TSG-RAN WG1 Adhoc Meeting, R1-1700401, Spokane, WA, USA, Jan. 16-20, 2017.

Iterdigital Inc., "HARQ Processing for NR", Agenda Item: 10.3.1.8, 3GPP TSG-RAN WG2 Meeting #98, R2-1704912, Hangzhou, P.R. China, May 15-19, 2017.

International Search Report issued by the Japan Patent Office for corresponding International Patent Application No. PCT/JP2017/031049, dated Nov. 21, 2018, with an English translation.

Written Opinion of the International Searching Authority issued by the Japan Patent Office for corresponding International Patent Application No. PCT/JP2017/031049, dated Nov. 21, 2018, with an English translation.

International Search Report issued by the Japan Patent Office for corresponding International Patent Application No. PCT/JP2017/031049, dated Nov. 21, 2017, with an English translation.

Written Opinion of the International Searching Authority issued by the Japan Patent Office for corresponding International Patent Application No. PCT/JP2017/031049, dated Nov. 21, 2017, with an English translation.

Notification of Reasons for Refusal issued by the Japan Patent Office for corresponding Japanese Patent Application No. 2019-538804, dated Jun. 15, 2021 with a full English machine translation.

\* cited by examiner

| INDEX (T111) | CODE RATE (T112) | MAXIMUM DECODER THROUGHPUT [Mbps] (T113) |
|---|---|---|
| 0 | 1/14 | 300 |
| 1 | 1/5 | 378 |
| 2 | 1/3 | 495 |
| 3 | 1/2 | 720 |
| 4 | 3/5 | 982 |
| 5 | 2/3 | 1285 |
| 6 | 3/4 | 1868 |
| 7 | 5/6 | 3056 |
| 8 | 8/9 | 5000 |

FIG. 5

| UE CATEGORY (T121) | MAXIMUM NUMBER OF DL-SCH TRANSPORT BLOCK BITS RECEIVED WITHIN A SUBFRAME (=1ms) (T122) | MAXIMUM NUMBER OF BITS OF A DL-SCH TRANSPORT BLOCK BITS RECEIVED WITHIN A SUBFRAME (=1ms) (T123) | TOTAL NUMBER OF SOFT CHANNEL BITS (T124) | MAXIMUM NUMBER OF SUPPORTED LAYERS OF SPATIAL MULTIPLEXING IN DL (T125) | MAXIMUM CODEWORD LENGTH RECEIVED WITHIN A SUBFRAME (=1ms) (T126) |
|---|---|---|---|---|---|
| CATEGORY 1 | 1250000 | 675000 | 20000000 | 2 | 750000 |
| CATEGORY 2 | 2500000 | 1250000 | 40000000 | 2 | 1500000 |
| CATEGORY 3 | 2500000 | 1250000 | 40000000 | 4 | 1500000 |
| CATEGORY 4 | 500000 | 2500000 | 80000000 | 2 | 3000000 |
| CATEGORY 5 | 500000 | 2500000 | 80000000 | 8 | 3000000 |

FIG. 12

| MCS INDEX | INITIAL TRANSMISSION | | RE-TRANSMISSION | |
|---|---|---|---|---|
| | MODULATION SCHEME | TBS INDEX | MODULATION SCHEME | CHANGED CODE RATE |
| 0 | QPSX | 0 | QPSX | 1/14 |
| 1 | QPSX | 2 | QPSX | 1/5 |
| 2 | QPSX | 4 | QPSX | 1/3 |
| 3 | QPSX | 6 | QPSX | 1/2 |
| 4 | QPSX | 8 | QPSX | 2/3 |
| 5 | 16QAM | 10 | 16QAM | 5/6 |
| 6 | 16QAM | 11 | 16QAM | 1/2 |
| 7 | 16QAM | 12 | 16QAM | 3/5 |
| 8 | 16QAM | 13 | 16QAM | 2/3 |
| 9 | 16QAM | 14 | 16QAM | 3/4 |
| 10 | 16QAM | 15 | 16QAM | 5/6 |
| 11 | 64QAM | 16 | 64QAM | 3/5 |
| 12 | 64QAM | 17 | 64QAM | 2/3 |
| 13 | 64QAM | 18 | 64QAM | 3/4 |
| 14 | 64QAM | 19 | 64QAM | 5/6 |
| 15 | 64QAM | 20 | 256QAM | 2/3 |
| 16 | 64QAM | 21 | 256QAM | 3/4 |
| 17 | 64QAM | 22 | 256QAM | 5/6 |
| 18 | 64QAM | 23 | 256QAM | 8/9 |
| 19 | 64QAM | 24 | RESERVED | RESERVED |
| 20 | 256QAM | 25 | | |
| 21 | 256QAM | 27 | | |
| 22 | 256QAM | 28 | | |
| 23 | 256QAM | 29 | | |
| 24 | 256QAM | 30 | | |
| 25 | 256QAM | 31 | | |
| 26 | 256QAM | 32 | | |
| 27 | 256QAM | 33 | | |
| 28 | RESERVED | RESERVED | QPSK | |
| 29 | | | 16QAM | |
| 30 | | | 64QAM | |
| 31 | | | 256QAM | |

RE-TRANSMISSION CONTROL METHOD, RADIO TERMINAL, AND RADIO BASE STATION

CROSS-REFERENCE TO RELATED APPLICATION

This application is a continuation application of International Application PCT/JP2017/031049 filed on Aug. 30, 2017 and designated the U.S., the entire contents of which are incorporated herein by reference.

FIELD

The embodiments discussed herein are related to a re-transmission control method, a radio terminal and a radio base station, and more particularly to a technology of appropriately performing re-transmission control in an ultra-reliable and low-latency communication.

BACKGROUND

In recent years, in a radio communication system (also referred to as a mobile communication system) such as a mobile phone system (cellular system), a next generation radio communication technique for achieving higher speed and larger capacity of radio communication has been discussed. For example, the 3rd Generation Partnership Project (3GPP) that is a standardization organization has already developed a specification for a communication standard called Long-Term Evolution (LTE) or a communication standard called LTE-Advanced (LTE-A) based on the radio communication technique of LTE, and continuously has performed work for expansion of the function thereof. For example, standardization of a fifth generation mobile communication system (also referred to as a 5G system) for realizing operation scenarios or contents of technical requirements presented by International Telecommunication Union Radiocommunication sector (ITU-R) has been under discussion.

In the LTE radio communication system (LTE system), hybrid automatic repeat request (HARQ) using a combination of error correction (forward error correction: FEC) and re-transmission control (automatic repeat request: ARQ) is employed. In the 5G system, employing HARQ is examined as a re-transmission control method. In a radio communication system employing HARQ, in a case where an occurrence of a transmission error of an information bit is detected by a receiver, a re-transmission request is performed from the receiver, and re-transmission control is performed from a transmitter in response to the re-transmission request.

In a case of the LTE system, a block as a re-transmission unit in performing re-transmission control is a transport block, and the number of transport blocks in the re-transmission unit is determined in accordance with the number of transmission antennas. For example, in a case where the number of transmission antennas is one, the number of transport blocks is set to 1. In a case where the number of transmission antennas is two, the number of transport blocks is set to 2. A code rate is fixed at 1/3 both in re-transmission and in initial transmission.

Examples of the related art include PTL 1: Japanese Laid-open Patent Publication No. 2010-219818, NPL 1: 3GPP TS 36.211 V14.2.0(2017-03), NPL 2: 3GPP TS 36.212 V14.2.0(2017-03), NPL 3: 3GPP TS 36.213 V14.2.0 (2017-03), NPL 4: 3GPP TS 36.300 V14.2.0(2017-03), NPL 5: 3GPP TS 36.321 V14.2.0(2017-03), NPL 6: 3GPP TS 36.322 V14.0.0(2017-03), NPL 7: 3GPP TS 36.323 V14.2.0 (2017-03), NPL 8: 3GPP TS 36.331 V14.2.0(2017-03), NPL 9: 3GPP TS 36.413 V14.2.0(2017-03), NPL 10: 3GPP TS 36.423 V14.2.0(2017-03), NPL 11: 3GPP TS 36.425 V14.0.0(2017-03), NPL 12: 3GPP TR 38.801 V14.0.0(2017-03), NPL 13: 3GPP TR 38.802 V14.0.0(2017-03), NPL 14: 3GPP TR 38.803 V14.0.0(2017-03), NPL 15: 3GPP TR 38.804 V14.0.0(2017-03), NPL 16: 3GPP TR 38.900 V14.2.0(2016-12), NPL 17: 3GPP TR 38.912 V14.0.0(2017-03), NPL 18: 3GPP TR 38.913 V14.0.0(2017-03), NPL 19: Y. Saito, Y. Kishiyama, A. Benjebbour, T. Nakamura, A. Li, and K. Higuchi, "Non-orthogonal multiple access (NOMA) for future radio access," Proc. IEEE VTC2013-Spring, pp. 1-5, Dresden, Germany, June 2013

SUMMARY

According to one aspect of the disclosed technology, a re-transmission control method of downlink data to be transmitted from a radio base station to a radio terminal includes: by the radio terminal, transmitting information regarding decoding performance of the radio terminal to the radio base station; receiving the downlink data from the radio base station; transmitting a re-transmission request of the downlink data to the radio base station in a case where an error in the downlink data is detected; receiving a re-transmission configuration based on the information regarding decoding performance of the radio terminal, from the radio base station in a physical downlink control channel (PDCCH), after transmission of the re-transmission request; receiving the downlink data re-transmitted from the radio base station; and decoding the re-transmitted downlink data in accordance with the re-transmission configuration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of terminal performance information to be transmitted from a radio terminal to a radio base station.

FIG. 5 is a diagram illustrating an example of a correspondence relation between a UE category and decoding performance of a radio terminal.

FIG. 12 is a diagram illustrating an example of a correspondence relation between a MCS index and a code rate.

DESCRIPTION OF EMBODIMENTS

Figure 1:
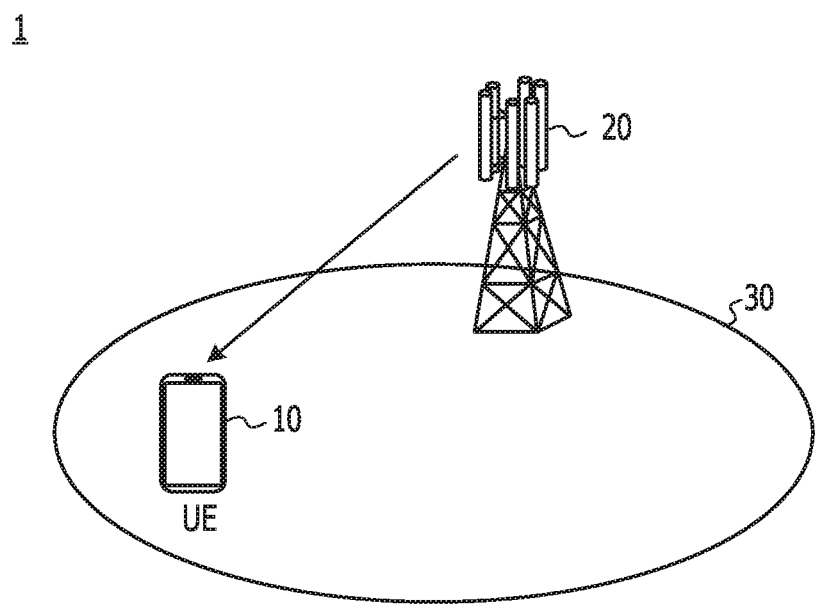
FIG. 1 is a diagram illustrating an overall configuration of a radio communication system according to a first embodiment.

In the fifth generation mobile communication system, for example, the appearance of services that require a low level of delay that is different from that in the related art, such as tactile communication and augmented reality, is expected. In addition, ultra-reliable and low-latency communications (URLLC) are provided as one of functional requirements. Therefore, for example, in LTE that is the fourth generation mobile communication system, whereas a latency of 10 milliseconds is supposed as a latency from a transmission source of a packet in a radio section to a transmission destination, the fifth generation mobile communication system aims to realize a latency of 1 millisecond or less.

In the LTE system being the prior art, in a case where an error is detected in some of a plurality of sub-blocks (also referred to as code blocks) constituting a transport block as a transmission unit, re-transmission control is performed in units of transport blocks, not in units of sub-blocks. Therefore, there are problems in that a sub-block in which an error is not detected is transmitted again, that the utilization efficiency of radio resources is reduced, and that it is difficult to satisfy the functional requirements for an ultra-reliable and low-latency communication.

An object of the technology in the disclosure is to provide a re-transmission control method and a radio communication apparatus in which it is possible to appropriately perform re-transmission control in an ultra-reliable and low-latency communication which are examined for the fifth generation mobile communication system.

In the discussion of the fifth generation mobile communication system, LDPC coding HARQ (which may be referred to as LDPC coding re-transmission control) has been examined in which a low-density parity-check (LDPC) code is employed for an error detection coding scheme. In the LDPC coding HARQ, when data is re-transmitted from a transmitter in response to a re-transmission request from a receiver, the codeword length of an LDPC code may be set to be longer than that in a first transmission (also referred to as code extension). With code extension, it is expected that decoding characteristics (which may be also referred to as a coding gain) at the receiver are improved.

If the codeword length of the LDPC code is set to be long, the decoding characteristics are improved, but the calculation amount required for decoding the LDPC code increases. In other words, the improvement in decoding characteristics of the LDPC code and the reduction in calculation amount required for decoding the LDPC code are in a trade-off relationship. Although a LDPC code having a sufficiently long codeword length provides decoding characteristics close to the Shannon limit to a receiver, decoding processing may not be completed within a predetermined period depending on performance (which may be referred to as decoding performance, processing performance, or arithmetic performance) of the receiver.

For example, in a case where a radio terminal is a receiver, the radio terminal may not return a response at a predetermined timing determined based on a reception timing of a DL signal, to a downlink signal (which may also be referred to as a DL signal, a DL signal sequence, a downlink signal, a DL data signal, DL data, and a re-transmission signal) from a base station. As a result, it is not possible that the base station does not detect a response from the radio terminal within a predetermined period, and thus the base station is to repeat re-transmission of the same DL signal to the radio terminal. Such an action may be an obstacle to satisfy the functional requirements of an ultra-reliable and low-latency communication.

According to one aspect of the disclosure below, there is provided a technology of adjusting re-transmission conditions of re-transmission control depending on the performance of a receiver. For example, it is possible to appropriately perform re-transmission control in an ultra-reliable and low-latency communication which are examined for the fifth generation mobile communication system.

Hereinafter, examples of a re-transmission control method, a radio terminal, and a radio base station disclosed in this application will be described in detail with reference to the drawings. The examples described below are not intended to limit the disclosed technology. The examples described below may be appropriately combined and performed. Here, details of all of NPL 1 to NPL 19 are incorporated herein by reference.

First Embodiment

FIG. 1 is a diagram illustrating an overall configuration of a radio communication system 1 according to a first embodiment. As illustrated in FIG. 1, the radio communication system 1 includes a radio terminal 10 and a radio base station 20. The radio terminal 10 is provided in an area 30 (also referred to as a cell, a macro cell, a small cell, a pico cell, a sector, a zone, or the like) of the radio service provided by the radio base station 20, and is configured to be capable of receiving a downlink signal to be transmitted from the radio base station 20. According to the first embodiment, the radio base station 20 may be configured to perform a radio communication with the radio terminal 10, for example, by a radio communication method in accordance with the standard of the fifth generation mobile communication system. In the example illustrated in FIG. 1, for easy description, one radio terminal 10 is illustrated. However, two or more radio terminals 10 may be provided.

Figure 2:
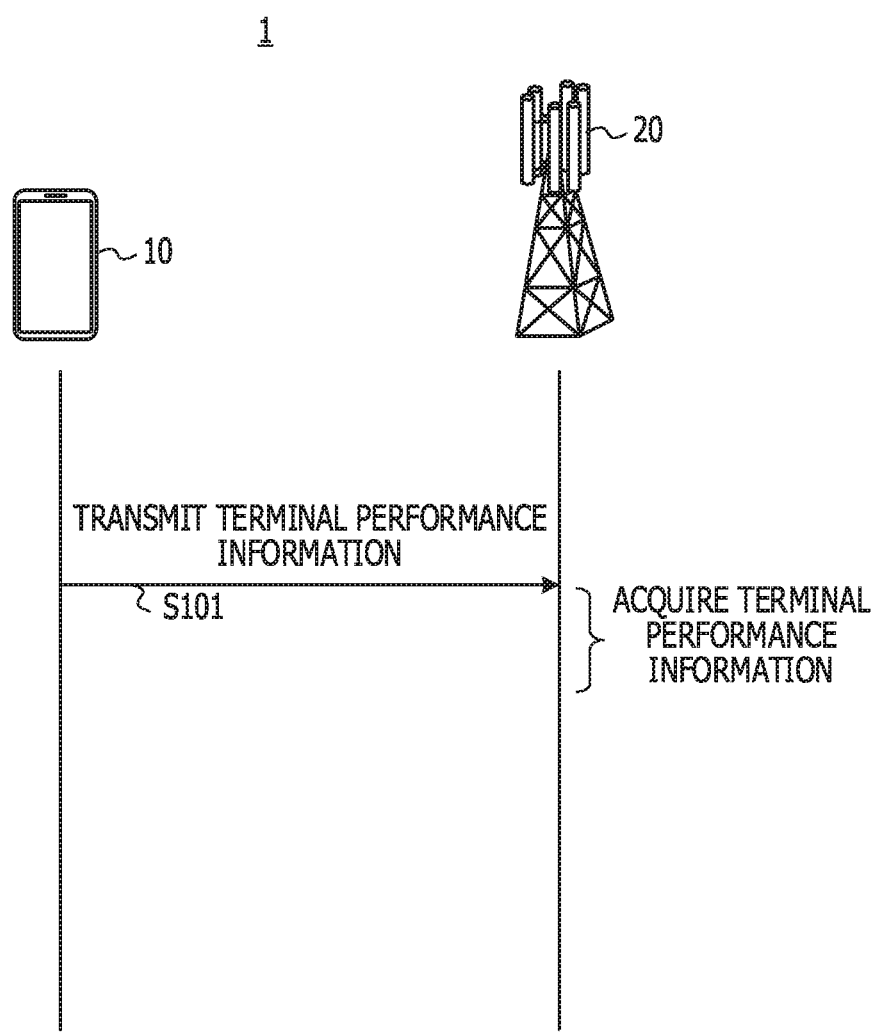
FIG. 2 is a diagram illustrating an example of a first sequence of a radio communication in the radio communication system according to the first embodiment.

FIG. 2 is a diagram illustrating an example of a first sequence of a radio communication in the radio communication system 1 according to the first embodiment. The first sequence illustrated in FIG. 2 may be performed after a coupling sequence in which the radio terminal 10 is coupled to the radio base station 20 or in the process of the coupling sequence.

The radio terminal 10 transmits terminal performance information to the radio base station 20 based on information regarding terminal performance which is set in advance in a memory of the radio terminal 10 (8101). The radio base station 20 receives a radio signal from the radio terminal 10 and acquires the terminal performance information (S102). Thus, the radio base station 20 may store the terminal performance information for the radio terminal 10 in the memory of the radio base station 20. The terminal performance information includes, for example, information regarding the decoding performance of the radio terminal 10.

FIG. 3 is a diagram illustrating an example of the terminal performance information T110 to be transmitted from the radio terminal 10 to the radio base station 20. The terminal performance information T110 illustrated in FIG. 3 includes an index value (Index) T111, a code rate T112, and a maximum decoder throughput T113. The index value T111 is an identifier of uniquely identifying a combination of the code rate T112 and the maximum decoder throughput T113.

The code rate T112 indicates the ratio of the information bit sequence in the systematic codeword (which may be also referred to as a code sequence or a code) generated by adding a redundant bit sequence (which may be also referred to as a redundant bit, a parity bit sequence, or a parity bit) used for error detection and correction to an information bit sequence (which may also be referred to as an information bit). When the length of the information bit sequence is set to k, and the total length of the systematic codeword is set to n, the code rate R (T112) is represented by, for example, R=k/n. In the example illustrated in FIG. 3, the code rate "1/14" indicates that 1 bitt of the 14-bit systematic codewords are an information bit sequence. In other words, the code rate "1/14" indicates that 13 bits of the 14-bit systematic codewords are redundant bit sequences. In other words, in a case of the code rate "1/14", the total length of the systematic codeword is 14 times the length of the information bit sequence before coding.

The maximum decoder throughput T113 is information regarding decoding performance of the radio terminal 10, and indicates a value obtained by converting the throughput of the radio terminal 10 within a predetermined unit time to have a one second unit. The throughput of the radio terminal 10 within a unit time may be, for example, the total codeword length (which may also be referred to as a bit length) of the systematic codeword which may be processed within the unit time, or a length of an information bit sequence which may be processed within the unit time, or a length of a redundant bit sequence which may be processed within the unit time. Here, the unit time may be referred to as a transmission time interval (TTI). In the example illustrated in FIG. 3, the maximum decoder throughput T113 "300 Mbps" (M is 10 to power of six) indicates a value obtained by converting the bit length of a DL signal sequence that may be processed by the radio terminal 10 within the unit time, into a value in a one second unit in a case where the code rate T112 is "1/14".

The terminal performance information transmitted from the radio terminal 10 to the radio base station 20 may include a part of the content example illustrated in FIG. 3. For example, in Process S101, the radio terminal 10 may transmit terminal performance information having a list of the maximum decoder throughput T113 to the radio base station 20.

Figure 4:
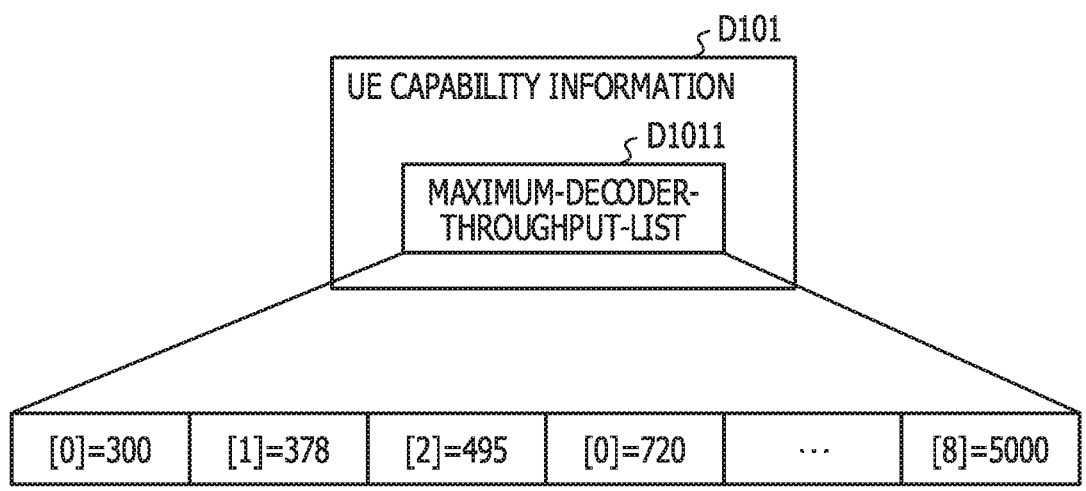
FIG. 4 is a diagram illustrating a modification example of the terminal performance information.

FIG. 4 is a diagram illustrating a modification example of the terminal performance information. The terminal performance information (UE Capability Information) D101 illustrated in FIG. 4 includes a maximum-decoder-throughput list D1011. The maximum-decoder-throughput list D1011 is a numerical array having one or more elements. Each element is associated with an index value corresponding to a position in the numerical array. For example, the maximum decoder throughput "300" (that is, 300 Mbps (300000000 bps)) associated with an index value "0" illustrated in FIG. 3 is stored in the zero-th element (which may be referred to as a leading element) of the maximum-decoder-throughput list D1011 in FIG. 4. Similarly, the maximum decoder throughput "378" (that is, 378 Mbps (378000000 bps)) associated with an index value "1" illustrated in FIG. 3 is stored in the first element of the maximum-decoder-throughput list D1011 in FIG. 4.

The modification example of the terminal performance information illustrated in FIG. 4 is useful in a case where the correspondence relation between the index value and the code rate of each element in the numerical array of the maximum-decoder-throughput list D1011 is previously shared by the radio terminal 10 and the radio base station 20. In other words, information indicating the correspondence relation between the index value and the code rate of each element in the numerical array of the maximum-decoder-throughput list D1011 may be stored in advance in a memory of each of the radio terminal 10 and the radio base station 20.

As another modification example, the terminal performance information may include a UE category indicating the attribute of the radio terminal 10, as information regarding the decoding performance of the radio terminal 10. In this case, it is assumed that the correspondence relation between the UE category and the decoding performance of the radio terminal 10 is shared in advance by the radio terminal 10 and the radio base station 20. In other words, information indicating a correspondence relation between the UE category and the decoding performance of the radio terminal 10 is stored in the memory of the radio base station 20. Information indicating a similar correspondence relation may also be stored in the memory of the radio terminal 10.

FIG. 5 is a diagram illustrating an example of the correspondence relation between the UE category and the decoding performance of the radio terminal 10. In a correspondence table illustrated in FIG. 5, a UE category T121, the maximum number T122 of DL-SCH transport block bits received within one subframe, the maximum number T123 of bits of one DL-SCH transport block received within one subframe, the total number of soft channel bits T124, the maximum number T125 of supported layers for spatial multiplexing in DL, and the maximum codeword length T126 received within one subframe (which may be referred to as the maximum codeword length T126, or information T126 regarding the decoding performance) are associated with each other. In FIG. 5, the maximum codeword length T126 is an example of information regarding the decoding performance of the radio terminal 10. The one sub-frame is an example of a unit time (TTI).

Figure 6:
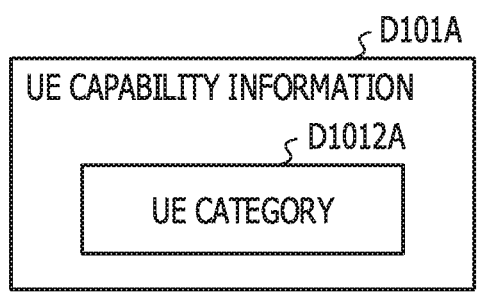
FIG. 6 is a diagram illustrating terminal performance information including the UE category.

FIG. 6 is a diagram illustrating the terminal performance information including the UE category. As illustrated in FIG. 6, terminal performance information (UE Capability Information) D101A may be transmitted from the radio terminal 10 to the radio base station 20 with including a UE category D1012A indicating the attribute of the radio terminal 10. In FIG. 6, the UE category D1012A is an example of information regarding the decoding performance of the radio terminal 10.

The radio base station 20 may receive the terminal performance information D101A including the UE category D1012A illustrated in FIG. 6 from the radio terminal 10, and acquire information T126 regarding the decoding performance of the radio terminal 10 from the correspondence table illustrated in FIG. 5, based on the UE category D1012A indicated by the terminal performance information D101A. For example, in a case where the UE category D1012A included in the terminal performance information D101A is "Category 1", the information T126 regarding the decoding performance of the radio terminal 10 is "750000" bit length from the correspondence table illustrated in FIG. 5.

Figure 7:
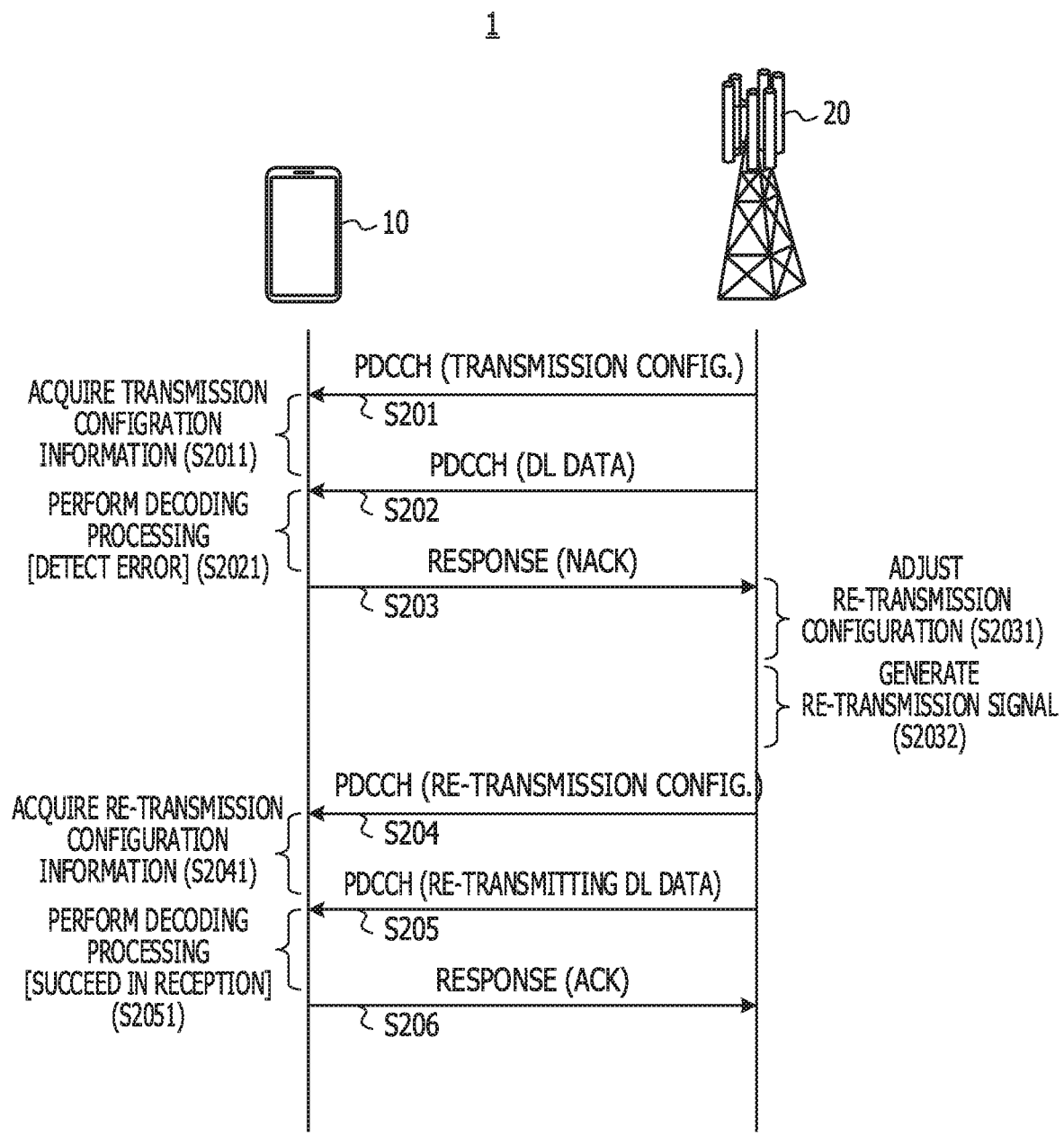
FIG. 7 is a diagram illustrating an example of a second sequence of the radio communication in the radio communication system according to the first embodiment.

FIG. 7 is a diagram illustrating an example of a second sequence of the radio communication in the radio communication system according to the first embodiment. The second sequence illustrated in FIG. 7 may be performed at any timing after the first sequence illustrated in FIG. 2, for example.

The radio base station 20 transmits transmission configuration information (transmission config.) indicating a modulation scheme when transmitting DL data to the radio terminal 10, the position of a radio resource, and the like, to the radio terminal 10 in a physical downlink control channel (PDCCH) (S201). The transmission configuration information may be referred to as downlink control information (DCI).

The radio terminal 10 acquires the transmission configuration information from the radio resources of the PDCCH (S2011). The transmission configuration information may indicate a modulation scheme, a position of the radio resource, and the like when transmitting DL data to the radio terminal 10.

The radio base station 20 modulates DL data for the radio terminal 10 in accordance with the modulation scheme or the like indicated by the transmission configuration information transmitted in Process S201, and transmits the modulated DL data to the radio terminal 10 in a physical downlink shared channel (PDSCH) (S202).

In Process S202, the radio base station 20 adds a redundant bit (which may be referred to as a redundant bit sequence) used for error detection and correction to DL data (which may be referred to as an information bit, an information bit sequence, a bit sequence, a transmission block, a transport block, a transmission unit block, and a main block) for each transport block size (TBS).

Figure 8:
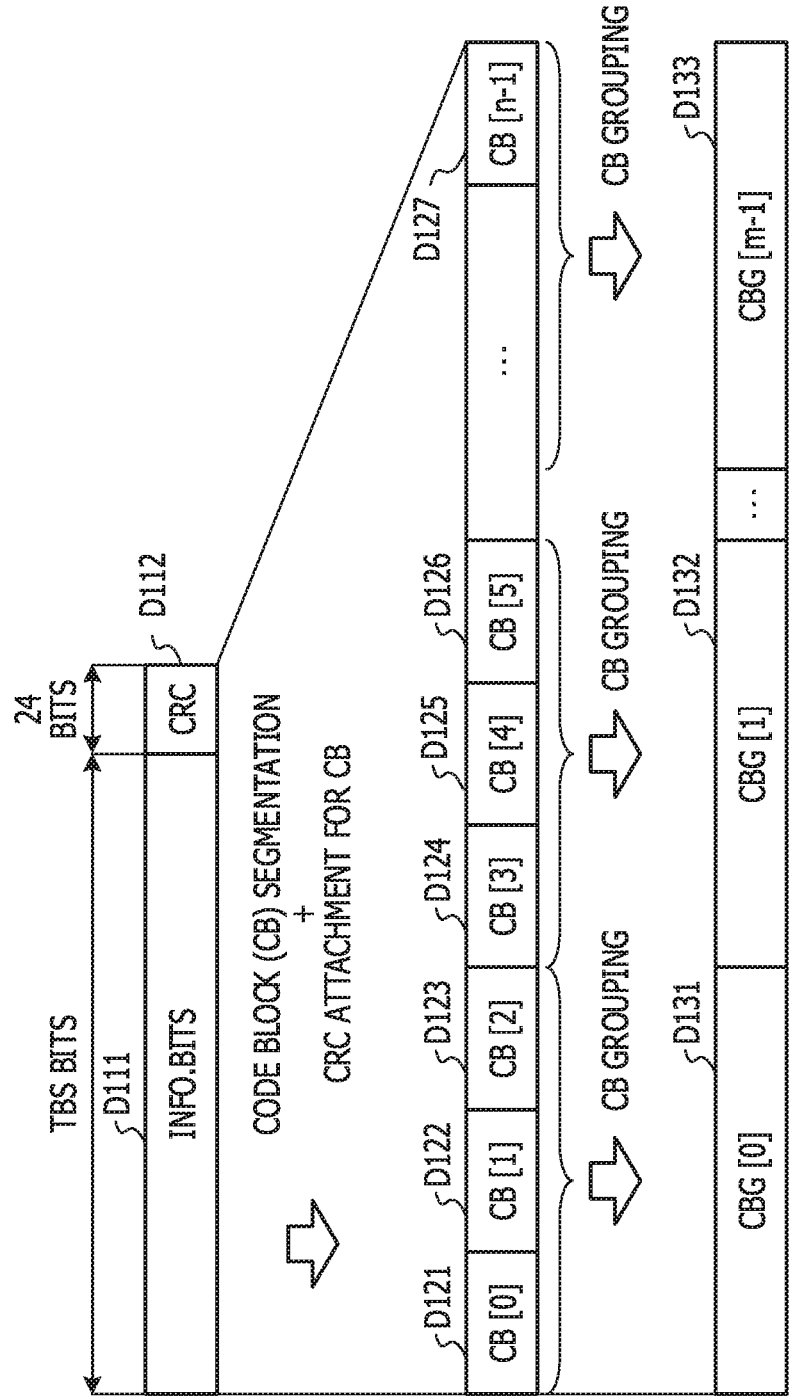
FIG. 8 is a schematic diagram illustrating a data structure of DL data.

FIG. 8 is a schematic diagram illustrating a data structure of DL data. In the example illustrated in FIG. 8, a redundant bit D112 having a predetermined length (for example, 24 bit length) is added to DL data (INFO. BITS) D111 having a transport block length (TBS BITS). A cyclic redundancy check (CRC) code having a length of 24 bits is used as an example of the redundant bit D112. Since the redundant bit is added, the radio terminal 10 may detect whether or not there is a decoding error, when decoding DL data (which may also be referred to as a transport block) for each transport block size (TBS). The detection result of the decoding error may be used, for example, as a trigger for DL data re-transmission in a downlink HARQ protocol.

Here, the bit sequence D111 corresponding to the transport block length among bit sequences of the DL data may be referred to as an information bit, an information bit sequence, a transmission block, a transport block, a transmission unit block, and a main block. The length of the block including the information bit D111 and the redundant bit D112 may be referred to as a transport block length after the redundant bit is added. Further, a block including the information bit D111 and the redundant bit D112 may be referred to as a transport block after the redundant bit is added.

In Process S202, the radio base station 20 performs code block segmentation on the transport block (information bit D111+redundant bit D112) after the redundant bit is added. With code block segmentation, the transport block after the redundant bit is added is segmented into code blocks (CBs) having a size suitable for coding processing of an encoder in the radio base station 20.

In Process S202, the radio base station 20 may add a redundant bit (for example, CRC) having a predetermined length (for example, a 24 bit length) to each code block. The radio terminal 10 may detect an error in a decoded code block at an early stage, and may end decoding processing at an early timing, by adding the redundant bit to each code block.

In the example illustrated in FIG. 8, one transport block is segmented into n code blocks D121 to D127 (n is a natural number equal to or greater than 1) by code block segmentation. In FIG. 8, the illustration of the redundant bit for each code block is omitted.

In Process S202, the radio base station 20 groups a predetermined number of code blocks to generate a code block group (CBG). Thus, in a case where an error is detected in the decoded code block, the radio terminal 10 may perform a re-transmission request not in a unit of a code block group, but in a unit of a transport block. With such an action, it is possible to improve utilization efficiency of radio resources when DL data is re-transmitted, and thus the action is useful in satisfying the functional requirements of an ultra-reliable and low-latency communication.

In the example illustrated in FIG. 8, three code blocks are grouped to one code block group, and thus m pieces of code block groups D131 to D133 are generated. A redundant bit having a predetermined length may be added to each code block group. Since the redundant bit is added to each code block group, the radio terminal 10 may detect whether or not an error occurs in a unit of a code block group, before starting decoding processing in a code block unit. In addition, the radio terminal 10 may perform the re-transmission request in a unit of the code block group, at an early stage.

The radio terminal 10 performs decoding processing of DL data in accordance with the transmission configuration information acquired in Process S2011 (S2021). In the example illustrated in FIG. 7, in Process S2021, the radio terminal 10 detects an error in decoding processing of the DL data.

In Process S2021, for example, in a case where an error in the code block is detected using the redundant bit added to each code block, the radio terminal 10 may determine the decoding of a code block group to which the code block belongs fails.

In Process S2021, in a case where the radio terminal 10 detects an error in the code block group using, for example, the redundant bit added to each code block group, the radio terminal 10 may determine that decoding of the code block group fails.

In Process S2021, in a case where the radio terminal 10 detects an error in a transport block using, for example, a redundant bit added to each transport block unit, the radio terminal 10 may determine that decoding of all code block groups belonging to the transport block fails.

The radio terminal 10 transmits a response signal (NACK) indicating a result of the decoding processing of the DL data in Process S2021 to the radio base station 20 (S203). In a case where an error is not detected in Process S2021, the radio base station 20 may transmit a response signal (ACK) indicating an acknowledgement in Process S203. In Process S203, the radio terminal 10 may transmit a response signal including a result of decoding processing (ACK or NACK) for each code block group (CBG) being a unit of a re-transmission request (which may be referred to as a re-transmission unit). Alternatively, in Process S203, the radio terminal 10 may transmit a response signal including information for identifying a code block group in which an error is detected, among decoding results for code block groups (CBGs) being a unit of a re-transmission request. The response signal (NACK) may also be referred to as a re-transmission request. The ACK is an abbreviation for acknowledgement, and the NACK is an abbreviation for a negative acknowledgement. The ACK means that the decoding processing has succeeded, and the NACK means that the decoding processing has failed.

Figure 9:
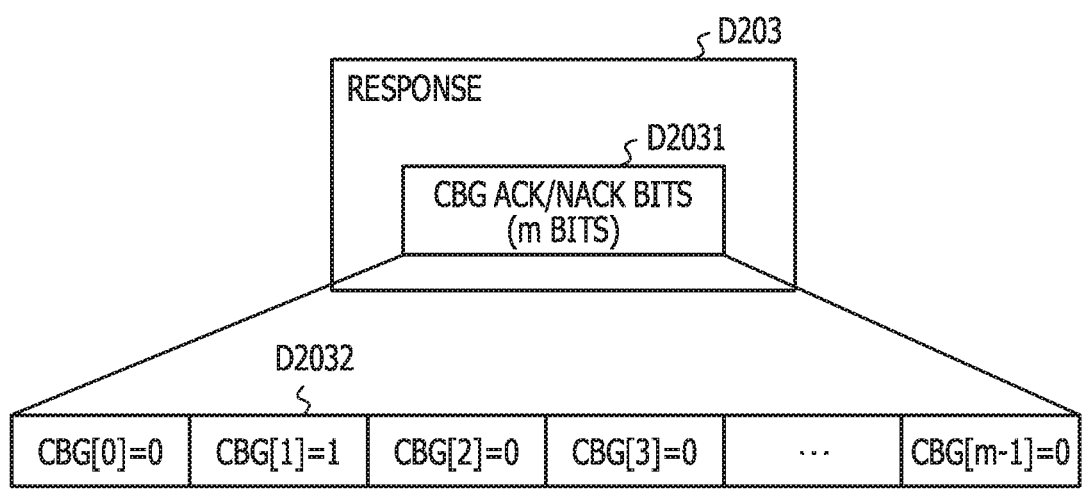
FIG. 9 is a diagram illustrating an example of a response signal.

FIG. 9 is a diagram illustrating an example of the response signal. A response signal D203 illustrated in FIG. 9 includes a code block group ACK/NACK bit sequence (CBG ACK/NACK bits) D2031. The code block group ACK/NACK bit sequence D2031 is an m-bit bit sequence indicating an ACK (0) or a NACK (1) for each code block group being the unit of re-transmission request. Each bit of the m-bit bit sequence D2031 is associated with the index of the code block group. In the present disclosure, the value indicating the ACK is not limited to "0", and for example, the value indicating the ACK may be set to "1", and the value indicating the NACK may be set to "0".

In the example illustrated in FIG. 9, a bit D2032 corresponding to a code block group CBG[1] having an index of "1" in the m-bit bit sequence D2031 is set to "1" being a value indicating the NACK. In the example illustrated in FIG. 9, a value "0" indicating an ACK is set in the m-bit bit sequence D2031 except for the bit D2032. In other words, in the example of FIG. 9, in Process S2021, the radio terminal 10 detects an error in the code block group CBG[1] having the index "1", and an error in another code block group is not detected.

In a case where the radio base station 20 receives the response signal (NACK), the radio base station 20 adjusts the re-transmission configuration, which is parameters in the re-transmission processing of a code block group indicated by the NACK in the response signal, based on the terminal performance information of the radio terminal 10, which has been acquired in Process S102 (S2031). The re-transmission configuration may include, for example, parameters for the code rate in the re-transmission processing of the code block group and parameters for the number of code block groups. The code block group in which NACK is indicated by the response signal is an example of downlink data indicated by a re-transmission request.

In Process S2031, the radio base station 20 may determine, for example, a code rate allowing improvement of decoding characteristics (which may also be referred to as a coding gain) in a range satisfying the decoding performance of the radio terminal 10, which is indicated by the terminal performance information. A specific example of adjusting the code rate will be described in detail in a second embodiment.

In Process S2031, the radio base station 20 may determine, for example, the number of code block group (which may be referred to as the number of code block group or the number of CBGs) included in one transmission of a re-transmission signal, in the range satisfying the decoding performance of the radio terminal 10, which is indicated by the terminal performance information. A specific example of adjusting the number of code block groups will be described in detail in a third embodiment.

The radio base station 20 generates a re-transmission signal including a code block group as a re-transmission target, which is indicated by the response signal (NACK) from the radio terminal 10, in accordance with the re-transmission configuration determined in Process S2031 (S2032).

In Process S2032, the radio base station 20 may perform coding (which may be referred to as re-coding) of a code block belonging to the code block group as the re-transmission target at the code rate indicated by the re-transmission configuration, for example. In this case, the radio base station 20 may regenerate the code block group as the re-transmission target by combining the re-coded code blocks. Thus, it is possible to generate a re-transmission signal including a code block group of which decoding characteristics are improved in the range satisfying the decoding performance of the radio terminal 10, which indicated by the terminal performance information. Such an action is useful in satisfying the functional requirements of an ultra high reliability, low delay communications.

In Process S2032, the radio base station 20 may limit the number of code block groups included in the re-transmission signal in accordance with the number of code block groups indicated by the re-transmission configuration, for example. For example, the number of code block groups included in the re-transmission signal may be reduced so as to absorb an increased code block size after coding, by changing the code rate to improve the decoding characteristics. Thus, it is possible to generate a re-transmission signal including a code block group of which decoding characteristics are improved in the range satisfying the decoding performance of the radio terminal 10, which indicated by the terminal performance information. Such an action is useful in satisfying the functional requirements of an ultra high reliability, low delay communications.

The radio base station 20 transmits information (which may also be referred to as re-transmission configuration information) indicating the re-transmission configuration determined in Process S2031 to the radio terminal 10 in a PDCCH (S204). In Process S204, the radio base station 20 may transmit downlink control information (DCI) including the re-transmission configuration information to the radio terminal 10 by using radio resources of the PDCCH.

Figure 10:
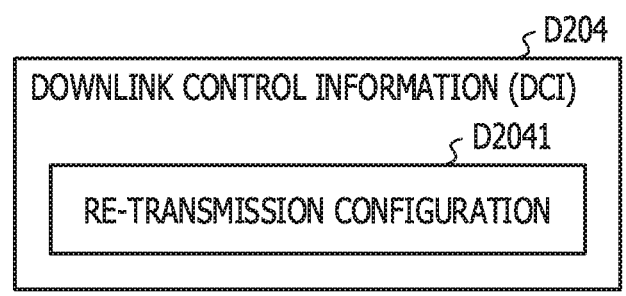
FIG. 10 is a diagram illustrating an example of downlink control information including a re-transmission configuration information.

FIG. 10 is a diagram illustrating an example of downlink control information including re-transmission configuration information. The downlink control information (DCI) D204 illustrated in FIG. 10 includes re-transmission configuration information (Re-transmission configuration) D2041. The re-transmission configuration information D2041 may include a parameter for the re-transmission configuration determined based on the terminal performance information of the radio terminal 10 in Process S2031. For example, the re-transmission configuration information D2041 may include a parameter for a code rate that allows improvement of the decoding characteristics and satisfying of the decoding performance of the radio terminal 10. For example, the re-transmission configuration information D2041 may include a parameter for the number of code block groups, which allows improvement of the decoding characteristics and satisfying of the decoding performance of the radio terminal 10.

The radio terminal 10 acquires the re-transmission configuration information from the radio resources of the PDCCH (S2041). In Process S2041, the radio terminal 10 may acquire the downlink control information (DCI), for example, from the radio resources of the PDCCH, so as to acquire the re-transmission configuration information to be included in the downlink control information. A parameter for a position of a radio resource and the like when DL data is transmitted may also be stored in the downlink control information.

Figure 11:
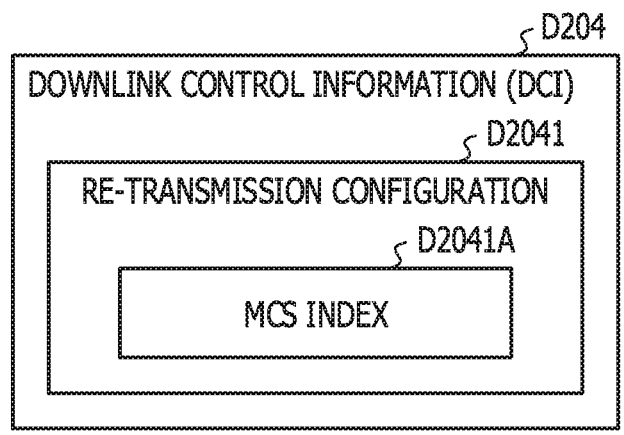
FIG. 11 is a diagram illustrating an example (part 1) of the re-transmission configuration information included in the downlink control information.

FIG. 11 is a diagram illustrating an example (part 1) of the re-transmission configuration information included in the downlink control information. In FIG. 11, re-transmission configuration information D2041 included in downlink control information D204 includes a modulation and coding scheme (MCS) index D2041A. The MCS index D2041A is an example of a parameter for a code rate allowing improvement of the decoding characteristics and satisfying of the decoding performance of the radio terminal 10.

FIG. 12 is a diagram illustrating an example of a correspondence relation between the MCS index and the code rate. The example illustrated in FIG. 12 describes that an MCS index T131 and an initial transmission parameter T132 are associated with each other. The example illustrated in FIG. 12 describes that the MCS index T131 and a re-transmission parameter T133 are associated with each other. The initial transmission parameter T132 includes a parameter indicating a modulation scheme and an index value (TBS Index) identifying a transport block size (TBS). The re-transmission parameter T133 includes a parameter indicating a modulation scheme and a parameter indicating a changed code rate. Here, the parameter indicating the changed code rate is an example of the re-transmission configuration determined in Process S2031. It is assumed that the radio terminal 10 and the radio base station 20 store information indicating the correspondence relation between the MCS index and the code rate as illustrated in FIG. 12 in each memory in advance.

In the example of FIG. 12, in a case where the modulation scheme of modulation processing performed in processing (S2032) of generating a re-transmission signal in accordance with the re-transmission configuration is "QPSK", and the code rate in coding processing is "1/3", the radio base station 20 may determine that a MCS index D2041A to be stored in the re-transmission configuration information D2041 illustrated in FIG. 11 is "2". In a case where the MCS index D2041A indicated by the re-transmission configuration information D2041 acquired in Process S2041 is "2", the radio terminal 10 may determine that the modulation scheme is "QPSK", and the code rate is "1/3" for the re-transmission signal including a code block group as the re-transmission target.

Figure 13:
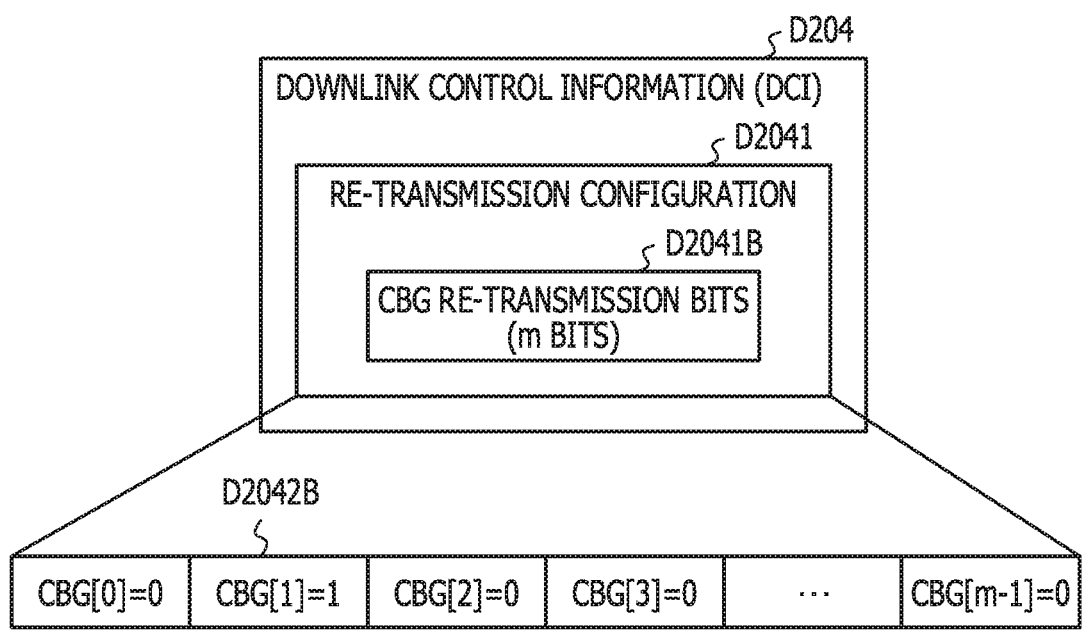
FIG. 13 is a diagram illustrating an example (part 2) of the re-transmission configuration information included in the downlink control information.

FIG. 13 is a diagram illustrating an example (part 2) of the re-transmission configuration information included in the downlink control information. In FIG. 13, the re-transmission configuration information D2041 included in the downlink control information D204 includes a code block group re-transmission list (CBG re-transmission bits) D2041B. The code block group re-transmission list D2041B is an example of a parameter for the number of code block groups (which may also be referred to as the number of re-transmission units) that allows improvement of the decoding characteristics and satisfying of the decoding performance of the radio terminal 10.

The code block group re-transmission list D2041B may be an m-bit bit sequence indicating whether to be included in the re-transmission signal (1) or not to be included (0) for each code block group being the unit of the re-transmission request, for example. Each bit of the m-bit bit sequence D2041B is associated with the index value of the code block group.

In the example illustrated in FIG. 13, a value "1" is stored in the bit D2042B corresponding to the code block group CBG[1] having an index of "1" in the m-bit bit sequence D2041B, and a value "0" is stored in other bits. By referring to the m-bit bit sequence D2041B, the radio terminal 10 may determine that the code block group included in the re-transmission signal is one, that is, code block group CBG[1].

Figure 14:
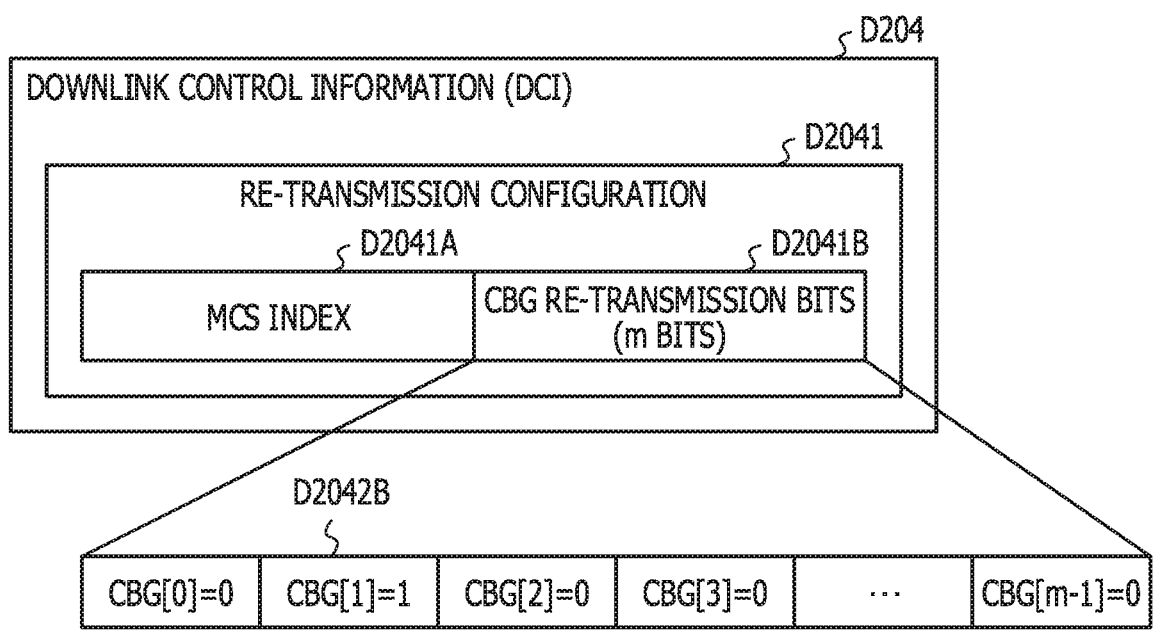
FIG. 14 is a diagram illustrating an example (part 3) of the re-transmission configuration information included in the downlink control information.

FIG. 14 is a diagram illustrating an example (part 3) of the re-transmission configuration information included in the downlink control information. In FIG. 14, the re-transmission configuration information D2041 included in the downlink control information D204 includes a modulation and coding scheme (MCS) index D2041A and a code block group re-transmission list (CBG re-transmission bits) D2041B.

The MCS index D2041A in FIG. 14 is identical to the MCS index D2041A described with reference to FIG. 11. The MCS index D2041A in FIG. 14 is an example of a parameter for a code rate allowing improvement of the decoding characteristics and satisfying of the decoding performance of the radio terminal 10. The radio terminal 10 may determine the code rate from the MCS index D2041A in accordance with the above-described procedure.

The code block group re-transmission list D2041B in FIG. 14 is identical to the code block group re-transmission list D2041B described with reference to FIG. 13. The code block group re-transmission list D2041B in FIG. 14 is an example of a parameter for the number of code block groups that allows improvement of the decoding characteristics and satisfying of the decoding performance of the radio terminal 10. The radio terminal 10 may identify the code block group included in the re-transmission signal from the code block group re-transmission list D2041B. In other words, the radio terminal 10 may determine the number of code block groups, which is included in the re-transmission signal, from the code block group re-transmission list D2041B.

Figure 15:
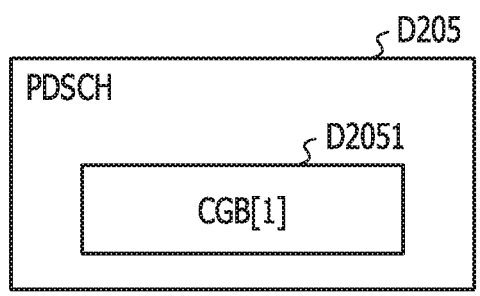
FIG. 15 is a schematic diagram illustrating an example of a PDSCH radio resource on which a re-transmission signal is disposed.

The radio base station 20 transmits the re-transmission signal (re-transmitting DL data) generated in Process S2032 to the radio terminal 10 using radio resources of the PDSCH (S205). FIG. 15 is a schematic diagram illustrating an example of a PDSCH radio resource on which the re-transmission signal is disposed. In the example illustrated in FIG. 15, a re-transmission signal D2051 including the code block group CBG[1] as the re-transmission target is disposed on a PDSCH radio resource D205.

The radio terminal 10 performs decoding processing of the code block group included in the re-transmission signal in accordance with the re-transmission configuration information acquired in Process S2041 (S2051). In the example illustrated in FIG. 7, in Process S2051, the radio terminal 10 succeeds in decoding processing of the code block group included in the re-transmission signal.

In Process S2051, the radio terminal 10 may verify whether or not there is an error, by using the redundant bit added in the code block unit for one or more code blocks belonging to the code block group included in the re-transmission signal, for example. For example, in the error detection processing using the redundant bits added in the code block unit, in a case where no error is detected in all code blocks belonging to the code block group included in the re-transmission signal, the radio terminal 10 may determine that the decoding processing has succeeded.

In Process S2051, the radio terminal 10 may perform error detection processing in a unit of the transport block, by using the redundant bit added in a unit of a transport block, after the decoding processing of all code blocks belonging to the code block group included in the re-transmission signal is ended. For example, in the error detection processing in the unit of transport blocks, in a case where no error is detected in the unit of the transport block, the radio terminal 10 may determine that the decoding processing has succeeded.

The radio terminal 10 transmits a response signal (ACK) indicating the result of decoding processing of the re-transmission signal in Process S2051 to the radio base station 20 (S206). In Process S206, the radio terminal 10 may transmit a response signal including a result of decoding processing (ACK or NACK) for each code block group (CBG) being a unit of a re-transmission request. Alternatively, in a case where decoding is successfully performed in units of transport blocks, the radio terminal 10 may transmit a response signal indicating an acknowledgement (ACK) in units of transport blocks.

As described above, in a radio communication between the radio terminal 10 and the radio base station 20, re-transmission control in units of code block groups is possible. The code block group is obtained by grouping code blocks generated by segmenting a transport block into code blocks in a predetermined unit, and may be a unit smaller than a transport block unit. Therefore, it is possible to improve the utilization efficiency of the radio resources in the re-transmission control. Such an action is useful in satisfying the functional requirements of an ultra high reliability, low delay communications.

Second Embodiment

A specific example of adjusting the code rate will be described as a second embodiment. With the technology described in detail in the second embodiment, the code rate allowing improvement of the decoding characteristics is determined in the range satisfying the decoding performance of the radio terminal 10.

Figure 16:
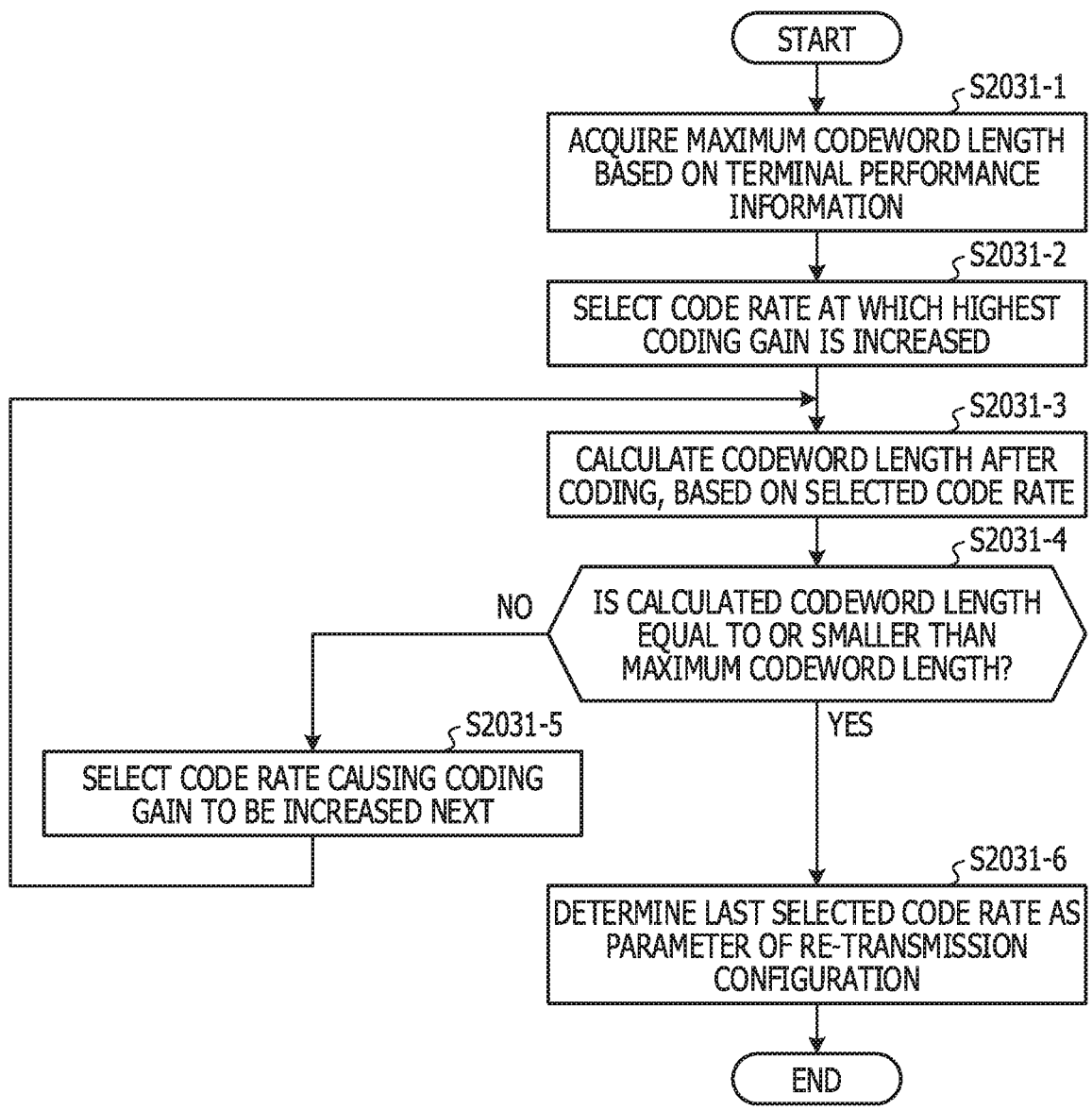
FIG. 16 is a diagram illustrating an example of adjustment processing of the code rate, which is performed in a radio base station according to a second embodiment.

FIG. 16 is a diagram illustrating an example of adjustment processing of the code rate, which is performed in the radio base station 20 according to the second embodiment. The processing illustrated in FIG. 16 may be performed by the radio base station 20 in the process of performing Process S2031 in the second sequence illustrated in FIG. 7.

The radio base station 20 acquires the maximum codeword length of the radio terminal 10 based on the terminal performance information acquired in Process S102 of the first sequence illustrated in FIG. 2 (S2031-1). The maximum codeword length indicates a value corresponding to a codeword length allowed to be processed by the radio terminal 10 per unit time. The maximum codeword length is an example of information regarding the decoding performance of the radio terminal 10.

In Process S2031-1, the radio base station 20 may acquire, for example, one or more maximum decoder throughputs T113 from the terminal performance information T110 illustrated in FIG. 3, as the maximum codeword length of the radio terminal 10. In this case, when the radio base station 20 performs the comparison determination in Process S2031-4 described later, the radio base station 20 may set the maximum decoder throughput T113 corresponding to the selected code rate to be the maximum codeword length. For example, according to the example illustrated in FIG. 3, in a case where the selected code rate is "1/3", the maximum decoder throughput T113 is "495 Mbps" (that is, 495000000 bps). The radio base station 20 may set "495 Mbit" as the maximum codeword length, based on the maximum decoder throughput "495 Mbps". Alternatively, the radio base station 20 may set a value converted into a codeword length per unit time (for example, one sub-frame), as the maximum codeword length, based on the maximum decoder throughput "495 Mbps". For example, in a case where the unit time is 1 millisecond, a value "495000 bits" obtained by multiplying "495 Mbps" by 1 millisecond (0.001 second) may be set as the maximum codeword length.

In Process S2031-1, the radio base station 20 may acquire the maximum codeword length of the radio terminal 10, for example, based on the correspondence relation illustrated in FIG. 5. In this case, the radio base station 20 may acquire the maximum codeword length (maximum codeword length received within a subframe) T126 from the correspondence relation illustrated in FIG. 5, based on the UE category D1012A included in the terminal performance information D101A illustrated in FIG. 6. For example, according to the example illustrated in FIG. 5, in a case where the UE category D1012A included in the terminal performance information D101A indicates "Category 3", the maximum codeword length is "1500000 bits".

The radio base station 20 selects the code rate that causes the coding gain (which may also be referred to as the decoding characteristics) to be increased most (S2031-2). In general, as the length of the redundant bit generated by coding processing becomes longer, the coding gain is increased more. In other words, in Process S2031-2, the radio base station 20 selects the code rate causing the codeword length after coding to be longest. For example, in a case where six choices of "1/14", "1/5", "1/3", "1/2", "2/3", and "5/6" are provided as choices of the code rate, the code rate "1/14" causes the codeword length after coding to be longest (14 times the codeword length before coding), and thus it is expected that the coding gain is increased most. In the example described above, the code rate causing the coding gain to be increased next is "1/5", and the code rate causing the code rate to be increased the next is "1/3". Thereafter, the code rate is in order of "1/2", "2/3", and "5/6". In other words, the code rate is selected in order in which the value of the inverse of the code rate is large.

The radio base station 20 calculates the codeword length after coding, based on the selected code rate (S2031-3). In Process S2031-3, the radio base station 20 may calculate the codeword length after coding, for example, by multiplying the codeword length of the code block belonging to the code block group as the re-transmission target by the inverse number of the selected code rate. For example, in a case where the selected code rate is "1/3", the codeword length after coding is calculated by adding up the value obtained by multiplying the codeword length of the code block by the inverse number "3" of the code rate.

Alternatively, in Process S2031-3, the radio base station 20 may calculate the codeword length after coding by multiplying the codeword length of the code block group as the re-transmission target by a ratio between the inverse number of the code rate in the previous transmission and the inverse number of the code rate selected in the previous transmission. For example, in a case where the code rate in the previous transmission is "5/6", and the code rate selected in the current time is "1/3", the radio base station 20 calculates the codeword length after coding based on the code rate selected in the current time, by multiplying the codeword length of the code block group as the re-transmission target in the previous transmission by a value "2.5" (that is, 3/(6/5)=15/6=2.5) obtained by dividing the inverse number "3" of the code rate selected in the current time by the inverse number "6/5" of the code rate in the previous transmission. In this case, it is possible to omit processing of calculating the codeword length after coding for each code block, and thus reduction in arithmetic operation cost is expected.

The radio base station 20 determines whether or not the codeword length (also referred to as an estimated codeword length) calculated in Process S2031-3 is equal to or smaller than the maximum codeword length acquired in Process S2031-1 (S2031-4). In a case where it is determined, in Process S2031-4, that the estimated codeword length is not equal to or smaller than the maximum codeword length (NO in S2031-4), the radio base station 20 selects the code rate causing the coding gain to be increased next (S2031-5) and performs Process S2031-3 and the subsequent processes. Thus, the selection (S2031-5) of the code rate, the calculation (S2031-3) of the estimated codeword length, and determination (S2031-4) by the maximum codeword length are repeated until the estimated codeword length calculated based on the selected codeword length becomes equal to or smaller than the maximum codeword length.

In a case where it is determined, in Process S2031-4, that the estimated codeword length is equal to or smaller than the maximum codeword length (YES in S2031-4), the radio base station 20 determines the last selected code rate as the parameter of the re-transmission configuration (S2031-6).

With the above processes, it is possible to determine the code rate allowing the coding gain (which may also be referred to as the decoding characteristics) to be increased most in the range satisfying the decoding performance of the radio terminal 10, as the parameter of the re-transmission configuration.

Third Embodiment

A specific example of adjusting the number of code block groups will be described as a third embodiment. With the technology described in detail in the third embodiment, the number of code block groups allowing improvement of the decoding characteristics is determined in the range satisfying the decoding performance of the radio terminal 10. The code block group is an example of an information unit of the re-transmission target.

Figure 17:
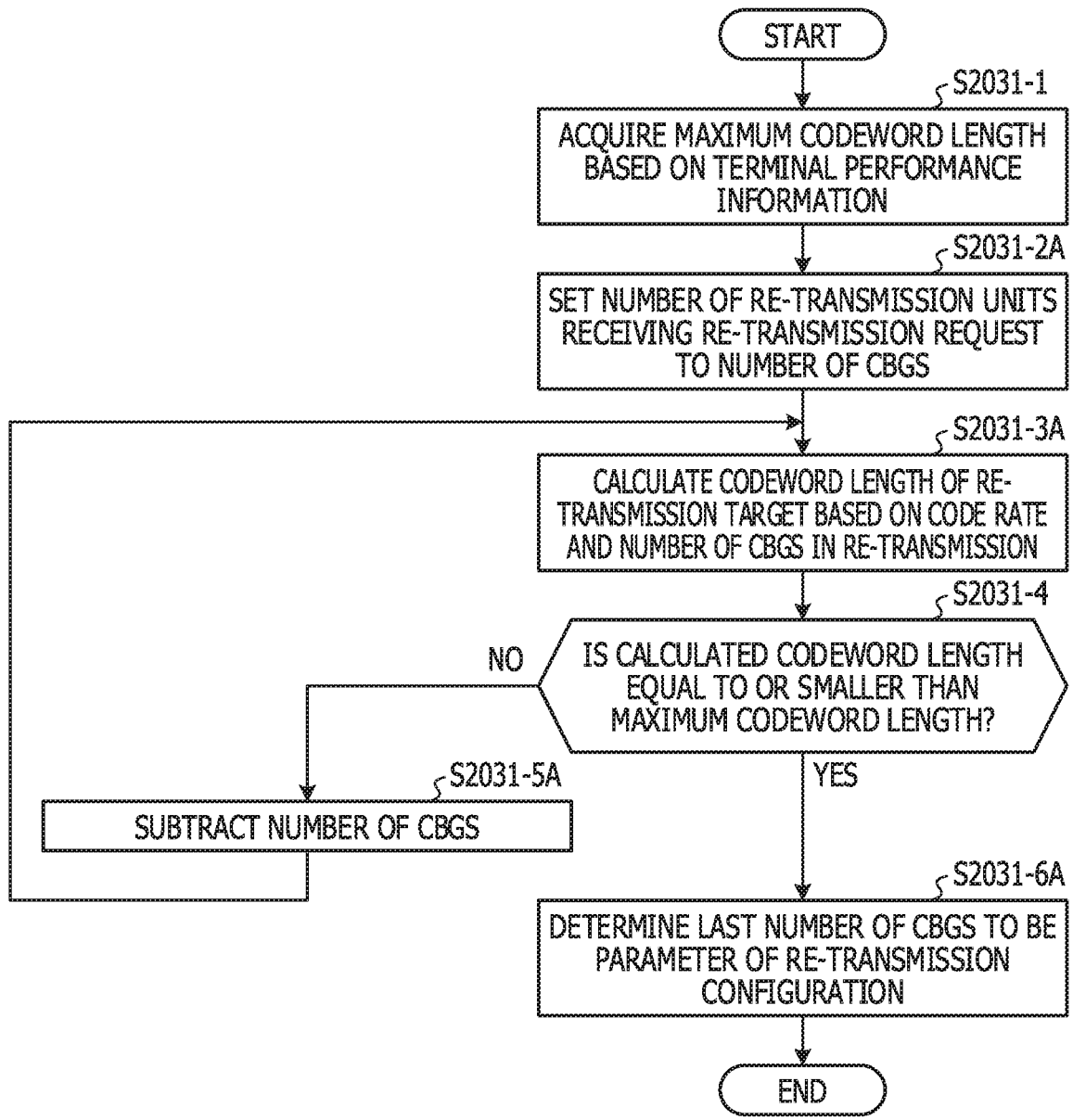
FIG. 17 is a diagram illustrating an example of the adjustment processing of the number of code block groups, which is performed in a radio base station according to a third embodiment.

FIG. 17 is a diagram illustrating an example of the adjustment processing of the number of code block groups, which is performed in the radio base station 20 according to the third embodiment. In the adjustment processing illustrated in FIG. 17, the similar processes to those in the adjustment processing in FIG. 16 are denoted by the same reference signs. In the adjustment processing illustrated in FIG. 17, for processes different from those in the adjustment processing in FIG. 16, the alphabet "A" is attached to the end of the reference sign. The processing illustrated in FIG. 17 may be performed by the radio base station 20 in the process of performing Process S2031 in the second sequence illustrated in FIG. 7.

The radio base station 20 acquires the maximum codeword length of the radio terminal 10 based on the terminal performance information acquired in Process S102 of the first sequence illustrated in FIG. 2 (S2031-1). The maximum codeword length indicates a value corresponding to a codeword length allowed to be processed by the radio terminal 10 per unit time.

The radio base station 20 acquires the number of re-transmission units (which may be referred to as the number of re-transmission targets) for the received re-transmission request based on the re-transmission request provided in the response signal transmitted from the radio terminal 10 in Process S203 of the second sequence illustrated in FIG. 7. Then, the radio base station 20 sets the acquired number to be the number of CBGs indicating the number of code block groups (CBGs) included in the re-transmission signal (S2031-2A). In Process S2031-2A, the radio base station 20 may set the number of CBGs based on the number of bits in which "1" indicating the NACK is stored in the code block group ACK/NACK bit sequence D2031 included in the response signal D203 from the radio terminal 10. For example, in the m-bit bit sequence D2031, in a case where the number of bits in which "1" indicating the NACK is stored is 3, the number of CBGs may be set to "3".

The radio base station 20 calculates the codeword length (also referred to as the estimated codeword length) of the re-transmission target based on the code rate (also referred to as a code rate in the current transmission) in re-transmission and the number of CBGs (S2031-3A). In Process S2031-3A, the radio base station 20 may use a predetermined code rate in re-transmission. For example, the code rate in the first transmission may be set to "5/6", and the code rate in the second transmission and the subsequent may be set to "1/3".

In the Process S2031-3A, the radio base station 20 calculates the codeword length of the code block groups of which the number corresponds to the number of CBGs, in a case where coding has been performed based on the code rate in re-transmission. For example, the radio base station 20 may calculate the codeword length (also referred to as a CB codeword length) of the code block in a case where coding has been performed based on the code rate in re-transmission. Then, the radio base station 20 may acquire the estimated codeword length by multiplying the CB codeword length by the total number (also referred to as the total number of CBs) of code blocks belonging to the code block groups of which the number corresponds to the number of CBGs.

In Process S2031-3A, in a case where the radio base station 20 holds the code block coded at the code rate in the previous transmission, in the memory, the radio base station 20 may calculate the CB codeword length by multiplying the codeword length of the code block held in the memory by the ratio between the inverse number of the code rate in the previous transmission and the inverse number of the code rate in the current transmission. For example, in a case where the code rate in the previous transmission is "5/6", and the code rate in the current transmission is "1/3", the radio base station 20 may calculate the CB codeword length by multiplying the codeword length of the code block held in the memory by a value "2.5" (that is, 3/(6/5)=15/6=2.5) obtained by dividing the inverse number "3" of the code rate in the current transmission by the inverse number "6/5" of the code rate in the previous transmission.

The radio base station 20 determines whether or not the codeword length (also referred to as an estimated codeword length) calculated in Process S2031-3A is equal to or smaller than the maximum codeword length acquired in Process S2031-1 (S2031-4). In a case where it is determined, in Process S2031-4, that the estimated codeword length is not equal to or smaller than the maximum codeword length (NO in S2031-4), the radio base station 20 subtracts the number of CBGs (Process S2031-5A) and performs Process S2031-3A and the subsequent processes. Thus, the subtraction (S2031-5A) of the number of CBGs, the calculation (S2031-3A) of the estimated codeword length, and determination (S2031-4) by the maximum codeword length are repeated until the estimated codeword length calculated based on the code rate in the current transmission and the number of CBGs becomes equal to or smaller than the maximum codeword length. In Process S2031-5A, for example, the radio base station 20 may subtract 1 from the number of CBGs every time processing of subtracting the number of CBGs is performed, or may subtract any natural number equal to or more than 2.

In a case where it is determined, in Process S2031-4, that the estimated codeword length is equal to or smaller than the maximum codeword length (YES in S2031-4), the radio base station 20 determines the last number of CBGs as the parameter of the re-transmission configuration (S2031-6A).

With the above processes, it is possible to determine the number of code block groups (number of CBGs) allowing the coding gain (which may also be referred to as the decoding characteristics) to be increased most in the range satisfying the decoding performance of the radio terminal 10, as the parameter of the re-transmission configuration.

<Hardware Configuration>

Figure 18:
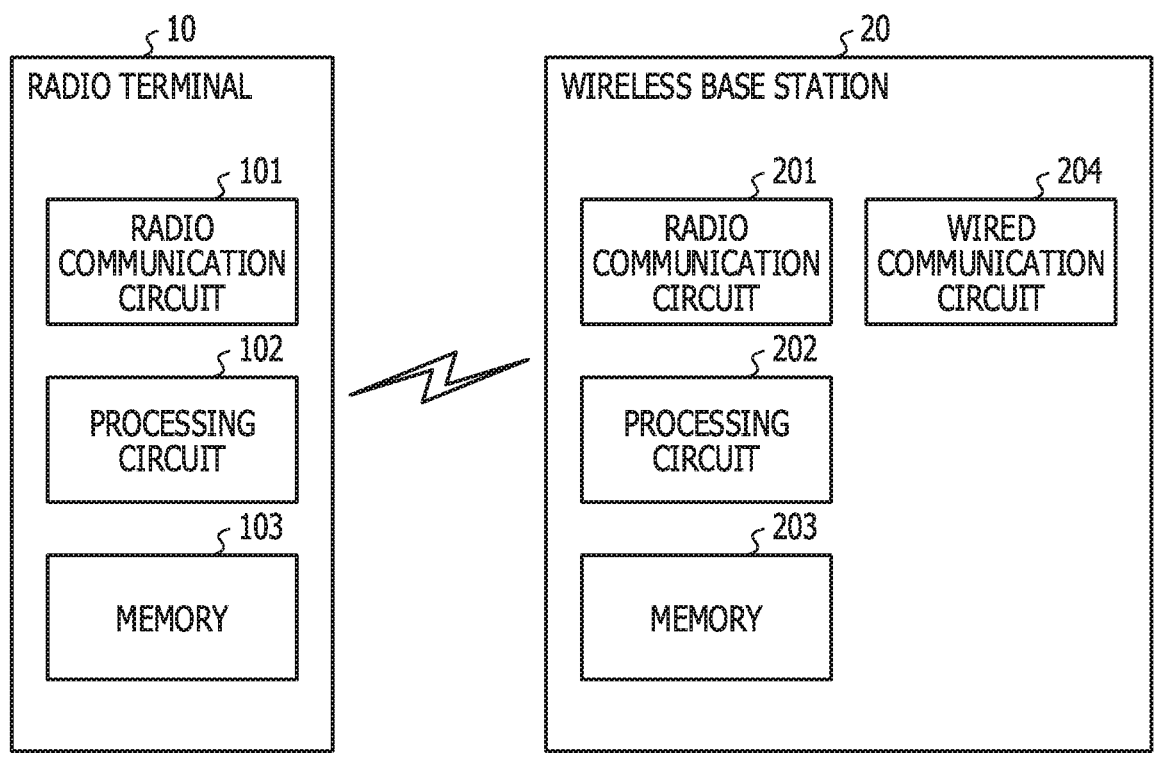
FIG. 18 is a diagram illustrating an example of a hardware configuration of the radio terminal and the radio base station in the radio communication system.

Lastly, a hardware configuration of each device used in the above-described first embodiment to third embodiment will be simply described. FIG. 18 is a diagram illustrating an example of a hardware configuration of the radio terminal 10 and the radio base station 20 in the radio communication system 1.

The radio terminal 10 illustrated in FIG. 18 includes a radio communication circuit 101, a processing circuit 102, and a memory 103. In the radio terminal 10 illustrated in FIG. 18, an antenna is not illustrated. The radio terminal 10 may include, for example, a display device such as a liquid crystal display, an input device such as a touch panel, and a battery such as a lithium-ion rechargeable battery.

In a downlink, the radio communication circuit 101 is configured to receive a baseband signal from the processing circuit 102, to generate a radio signal having a predetermined output level from the baseband signal, and to radiate the radio signal to a space through the antenna. In an uplink, the radio communication circuit 101 is configured to receive a radio signal input from the antenna, to convert the radio signal into a baseband signal, and to supply the baseband signal to the processing circuit 102. The radio communication circuit 101 may be coupled to be capable of communicating with the processing circuit 102 through a transmission circuit. The transmission circuit may be a transmission circuit conforming to a standard such as M-PHY or Dig-RF. As described above, the radio communication circuit 101 has an aspect of a communication unit (also referred to as a transmission/reception unit or a first transmission/reception unit) having a function to perform a radio communication with the radio base station 20.

The processing circuit 102 is configured to perform baseband signal processing. In an uplink, the processing circuit 102 is configured to generate a baseband signal based on a protocol stack in the radio communication system, and to output the baseband signal to the radio communication circuit 101. In a downlink, the processing circuit 102 is configured to perform reception processing such as demodulation or decoding on a baseband signal input from the radio communication circuit 101, based on the protocol stack in the radio communication system. In other words, in an uplink, the processing circuit 102 has an aspect as a circuit that sequentially processes transmission data from a higher layer to a lower layer, and transmits the processed transmission data to the radio base station 20 as a reception apparatus through the radio communication circuit 101, in accordance with procedures of a protocol stack in which a radio communication function is divided into a plurality of layers. In a downlink, the processing circuit 102 has an aspect as a circuit that sequentially processes a radio signal received through the radio communication circuit 101 from a lower layer to a higher layer, in accordance with procedures of the protocol stack in which the radio communication function is divided into a plurality of layers. Here, in a downlink, receiving an input of a baseband signal from the radio communication circuit 101 has an aspect of receiving the radio signal from the radio base station 20 through the radio communication circuit 101.

The processing circuit 102 may be, for example, an arithmetic operation device that realizes an operation of the radio terminal 10 according to the above-described various embodiments by reading and executing a program stored in the memory 103. In other words, the processing circuit 102 has an aspect as a subject that performs the flow of the processing in the radio terminal 10 illustrated in FIG. 7. Examples of the processing circuit 102 include a central processing unit (CPU), a microprocessor unit (MPU), a digital signal processor (DSP), and a field-programmable gate array (FPGA). The processing circuit 102 may be a multicore processor including two or more cores. Regarding the processing circuit 102, two or more processing circuits 102 may be mounted according to each layer in a protocol stack of the radio communication system. For example, the processing circuit 102 that performs processing as a medium access control (MAC) entity belonging to a MAC layer, the processing circuit 102 that performs processing as a radio link control (RLC) entity belonging to an RLC layer, and the processing circuit 102 that performs processing as a packet data convergence protocol (PDCP) entity belonging to a PDCP layer may be separately mounted. The processing circuit 102 is also referred to as a C-CPU. In the radio terminal 10, a processor circuit (also referred to as an A-CPU) executing an application may be mounted in addition to the processing circuit 102. The processing circuit 102 may be mounted in one chip along with a processor circuit (also referred to as an A-CPU), and may be mounted in separate chips. The processing circuit 102 has an aspect as a control unit (also referred to as a first control unit) having a function of controlling an operation of the radio terminal 10.

The memory 103 is a circuit configured to store and hold data or a program related to baseband signal processing performed by the processing circuit 102. The memory 103 is configured to include at least one both or one of a nonvolatile storage device and a volatile storage device. For example, the memory may include a random-access memory (RAM), a read-only memory (ROM), a solid state drive (SSD), and a hard disk drive (HDD). In FIG. 18, the memory 103 is the generic name of various storage devices such as main storage devices and auxiliary storage devices. Regarding the memory 103, two or more memories 103 may be mounted according to each layer in a protocol stack of the radio communication system in the same manner as the processing circuit 102. For example, the memory 103 used for a process as a MAC entity belonging to the MAC layer, the memory 103 used for a process as an RLC entity belonging to the RLC layer, and the memory 103 used for a process as a PDCP entity belonging to the PDCP layer may be separately mounted.

The radio base station 20 illustrated in FIG. 18 includes a radio communication circuit 201, a processing circuit 202, a memory 203, and a wired communication circuit 204. In the radio base station 20 illustrated in FIG. 18, an antenna is not illustrated.

In a downlink, the radio communication circuit 201 is configured to receive a baseband signal from the processing circuit 202, to generate a radio signal having a predetermined output level by using the baseband signal, and to radiate the radio signal to the space through the antenna. In an uplink, the radio communication circuit 201 is configured to receive a radio signal input from the antenna, to convert the radio signal into a baseband signal, and to supply the baseband signal to the processing circuit 202. The radio communication circuit 201 may be coupled to the processing circuit 202 so as to enable communication with the processing circuit 202 via a transmission path such as a common public radio interface (CPRI), and may also be referred to as a remote radii head (RRH) or remote radio equipment (RRE). A combination of the radio communication circuit 201 and the processing circuit 202 is not limited to a one-to-one basis. A plurality of processing circuits 202 may be associated with a single radio communication circuit 201, a plurality of radio communication circuits 201 may be associated with a single processing circuit 202, and a plurality of radio communication circuits 201 may be associated with a plurality of processing circuits 202. As described above, the radio communication circuit 201 has an aspect as a communication unit (also referred to as a transmission and reception unit or a second transmission and reception unit) having a function to perform a radio communication with the radio terminal 10.

The processing circuit 202 is configured to perform baseband signal processing. In a downlink, the processing circuit 202 is configured to generate a baseband signal based on a protocol stack in a radio communication system, and to output the baseband signal to the radio communication circuit 201. In an uplink, the processing circuit 202 is configured to perform reception processing such as demodulation or decoding on a baseband signal input from the radio communication circuit 201 based on the protocol stack in the radio communication system. In other words, in a downlink, the processing circuit 202 has an aspect as a circuit that sequentially processes transmission data which is to be transmitted to the radio terminal 10 as a receiving device from the higher layer to the lower layer in accordance with the procedures of the protocol stack in which the function of radio communication is divided into a plurality of layers, and transmits data obtained by the processing through the radio communication circuit 201. In an uplink, the processing circuit 202 has an aspect of a circuit that sequentially processes a radio signal received via the radio communication circuit 201 from a lower layer to a higher layer, according to procedures of a protocol stack in which a radio communication function is divided into a plurality of layers. Here, in an uplink, receiving an input of a baseband signal from the radio communication circuit 201 has an aspect of receiving a radio signal from the radio terminal 10 through the radio communication circuit 201.

The processing circuit 202 may be, for example, an arithmetic operation device that realizes an operation of the radio base station 20 according to the above-described various embodiments by reading and executing a program stored in the memory 203. In other words, the processing circuit 202 has a function as a subject that performs the flow of the processing in the radio base station 20 illustrated in FIGS. 7, 16, and 17. Examples of the processing circuit 202 may include a central processing unit (CPU), a microprocessor unit (MPU), a digital signal processor (DSP), and a field-programmable gate array (FPGA). The processing circuit 202 may be a multicore processor including two or more cores. Regarding the processing circuit 202, two or more processing circuits 202 may be mounted according to each layer in a protocol stack of the radio communication system. For example, the processing circuit 202 executing a process as a MAC entity belonging to the MAC layer, the processing circuit 202 executing a process as an RLC entity belonging to the RLC layer, and the processing circuit 202 executing a process as a PDCP entity belonging to the PDCP layer may be separately mounted. As described above, the processing circuit 202 has an aspect as a control unit (also referred to as a second control unit) having a function to control an operation of the radio base station 20.

The memory 203 is a circuit configured to store and hold data or a program related to baseband signal processing executed by the processing circuit 202. The memory 203 is configured to include at least one both or one of a nonvolatile storage device and a volatile storage device. For example, the memory may include a random-access memory (RAM), a read-only memory (ROM), a solid state drive (SSD), and a hard disk drive (HDD). In FIG. 18, the memory 203 is the generic name of various storage devices such as main storage devices and auxiliary storage devices. Regarding the memory 203, two or more memories 203 may be mounted according to each layer in a protocol stack of the radio communication system in the same manner as the processing circuit 202. For example, the memory 203 used for a process as a MAC entity belonging to the MAC layer, the memory 203 used for a process as an RLC entity belonging to the RLC layer, and the memory 203 used for a process as a PDCP entity belonging to the PDCP layer may be separately mounted.

The wired communication circuit 204 performs conversion into packet data with a format that is suitable to be output to another device and transmits the packet data to another device, or extracts data from another device and outputs the data to the memory 203 or the processing circuit 202. An example of another apparatus may be another radio base station, a mobility management entity (MME), or a serving gateway (SGW). The MME or the SGW is also referred to as a core node, and a logical communication interface used for communication with the core node is also referred to as an S1 interface. A logical communication interface used in a communication with another radio base station device is also referred to as the X2 interface.

The feature points and the advantages of the embodiment will become apparent through the detailed description. This is intended to cover the features and advantages of the embodiment without departing from the spirit and the scope of the claims. In addition, any person skilled in the related art may easily conceive of all improvements and changes. Therefore, there is no intention to limit the scope of the inventive embodiments to the embodiment described above, and appropriate modifications and equivalents included in the scope disclosed in the embodiment may be used. For example, the respective steps disclosed in the present specification are not required to be processed in a time series according to the order described as an example of a flow of a process, and orders of steps may be replaced with each other within the scope of the concept of the present disclosure disclosed in the claims, or a plurality of steps may be executed in parallel. It is desirably noted that the circumstances that may occur in the fifth-generation mobile communication system clarified in the above detailed description may be found when the fifth generation mobile communication system is examined from one aspect, and other circumstances may be found when the fifth generation mobile communication system is examined from other aspects. In other words, the feature points and the advantages of the present disclosure are not limited to an application for solving the situations described in the detailed description.

Lastly, configurations of the embodiments of the present disclosure are examples for embodying the technical spirit of the present disclosure, and the present disclosure is not intended to be limited to the configurations of the embodiments and is similarly applicable to other embodiments included in the claims. For example, it is desirably be noted that the terms in the disclosure may be renamed when the specifications in the subsequent fifth generation mobile communication system are set.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A re-transmission control method of downlink data to be transmitted from a radio base station to a radio terminal, the method comprising:
   by the radio terminal,
   transmitting information regarding decoding performance of the radio terminal to the radio base station, the decoding performance of the radio terminal including one or more parameters selected from a group of parameters consisting of an index value, a code rate, and a maximum decoder throughput;
   receiving the downlink data from the radio base station;
   transmitting a re-transmission request of the downlink data to the radio base station in a case where an error in the downlink data is detected;
   receiving a re-transmission configuration based on the information regarding decoding performance of the radio terminal, from the radio base station in a physical downlink control channel (PDCCH), after transmission of the re-transmission request;
   receiving the downlink data re-transmitted from the radio base station; and
   decoding the re-transmitted downlink data in accordance with the re-transmission configuration.

2. The re-transmission control method according to claim 1,
   wherein
   the code rate indicated by the parameter for the code rate, which is included in the re-transmission configuration does not exceed decoding performance of the radio terminal, which is indicated by information regarding the decoding performance of the radio terminal, and
   the radio terminal receives the re-transmission configuration including the parameter for the code rate from the radio base station in the PDCCH.

3. The re-transmission control method according to claim 2,
   wherein the parameter for the code rate is a modulation and coding scheme (MCS) index.

4. The re-transmission control method according to claim 1,
   wherein the downlink data is configured by one or more re-transmission units,
   the re-transmission configuration includes a parameter for a number of the re-transmission units to be retransmitted in the downlink data, and
   the radio terminal receives the re-transmission configuration including the parameter for the number of the re-transmission units from the radio base station in the PDCCH.

5. A radio terminal capable of performing re-transmission control of downlink data transmitted from a radio base station, the radio terminal comprising:
   a controller configured to operate the radio terminal to
   transmit information regarding decoding performance of the radio terminal to the radio base station, the decoding performance of the radio terminal including one or more parameters selected from a group of parameters consisting of an index value, a code rate, and a maximum decoder throughput,
   receive the downlink data from the radio base station,
   transmit a re-transmission request of the downlink data to the radio base station in a case where an error is detected in the downlink data,
   receive a re-transmission configuration based on the information regarding the decoding performance of the radio terminal from the radio base station in a physical downlink control channel (PDCCH), after the re-transmission request is transmitted,
   receive the downlink data which has been re-transmitted from the radio base station, and
   decode the re-transmitted downlink data in accordance with the re-transmission configuration.

6. The radio terminal according to claim 5,
   wherein
   the code rate indicated by the parameter for the code rate, which is included in the re-transmission configuration does not exceed decoding performance of the radio terminal, which is indicated by information regarding the decoding performance of the radio terminal, and
   the controller operates the radio terminal to receive the re-transmission configuration including the parameter for the code rate from the radio base station in the PDCCH.

7. The radio terminal according to claim 6,
   wherein the parameter for the code rate is a modulation and coding scheme (MCS) index.

8. The radio terminal according to claim 5,
   wherein the downlink data is configured by one or more re-transmission units,
   the re-transmission configuration includes a parameter for a number of the re-transmission units to be retransmitted in the downlink data, and
   the controller operates the radio terminal to receive the re-transmission configuration including the parameter for the number of the re-transmission units from the radio base station in the PDCCH.

9. A radio base station capable of performing re-transmission control of downlink data to be transmitted to a radio terminal, the radio base station comprising:
   a controller configured to operate the radio base station to
   receive information regarding decoding performance of the radio terminal from the radio terminal, the decoding performance of the radio terminal including one or more parameters selected from a group of parameters consisting of an index value, a code rate, and a maximum decoder throughput,
   transmit the downlink data to the radio terminal,
   in a case where a re-transmission request indicating that an error is detected in the downlink data is received from the radio terminal, transmit re-transmission configuration based on the information regarding the decoding performance of the radio terminal to the radio terminal in a physical downlink control channel (PDCCH), and transmit the downlink data indicated by the re-transmission request to the radio terminal in accordance with the re-transmission configuration and causes the radio terminal to decode the downlink data in accordance with the re-transmission configuration.

10. The radio base station according to claim 9, wherein the code rate indicated by the parameter for the code rate, which is included in the re-transmission configuration does not exceed decoding performance of the radio terminal, which is indicated by information regarding the decoding performance of the radio terminal, and the controller operates the radio base station to transmit the re-transmission configuration including the parameter for the code rate to the radio terminal in the PDCCH.

11. The radio base station according to claim 10, wherein the parameter for the code rate is a modulation and coding scheme (MCS) index.

12. The radio base station according to claim 9, wherein the downlink data is configured by one or more re-transmission units, the re-transmission configuration includes a parameter for a number of the re-transmission units to be retransmitted in the downlink data, and the controller operates the radio base station to transmit the re-transmission configuration including the parameter for the number of the re-transmission units to the radio terminal in the PDCCH.

* * * * *